United States Patent [19]
Angelbeck

[11] 3,857,636
[45] Dec. 31, 1974

[54] MEASUREMENT OF PHASE PROFILE ACROSS A HIGH POWER LASER BEAM

[75] Inventor: Albert W. Angelbeck, Manchester, Conn.

[73] Assignee: United Aircraft Corporation, East Hartford, Conn.

[22] Filed: Oct. 3, 1973

[21] Appl. No.: 403,291

[52] U.S. Cl. ............................. 356/106 R, 356/113
[51] Int. Cl. .............................................. G01b 9/02
[58] Field of Search............. 356/106 S, 113, 106 R, 356/109; 250/339, 340, 341

[56] References Cited
UNITED STATES PATENTS

| | | |
|---|---|---|
| 3,202,052 | 8/1965 | Rambauske..................... 356/106 R |
| 3,494,698 | 2/1970 | Neumann........................ 356/106 R |
| 3,563,663 | 2/1971 | Barringer........................ 356/106 S |
| 3,572,882 | 3/1971 | Neumann........................ 356/106 R |

*Primary Examiner*—Harold A. Dixon
*Attorney, Agent, or Firm*—Anthony J. Criso

[57] ABSTRACT

A diagnostic device for measuring the spatial distribution of the phase profile of a high power beam of laser radiation having spatial and temporal amplitude fluctuations is disclosed. The device includes means for extracting a sample beam from the high power beam, an interferometer having phase shifting means in one leg thereof, means for scanning the pattern produced with the interferometer across optical detection means, a detector feedback to the phase shifter, and a plotter of phase spatial profile of the sample beam.

9 Claims, 1 Drawing Figure

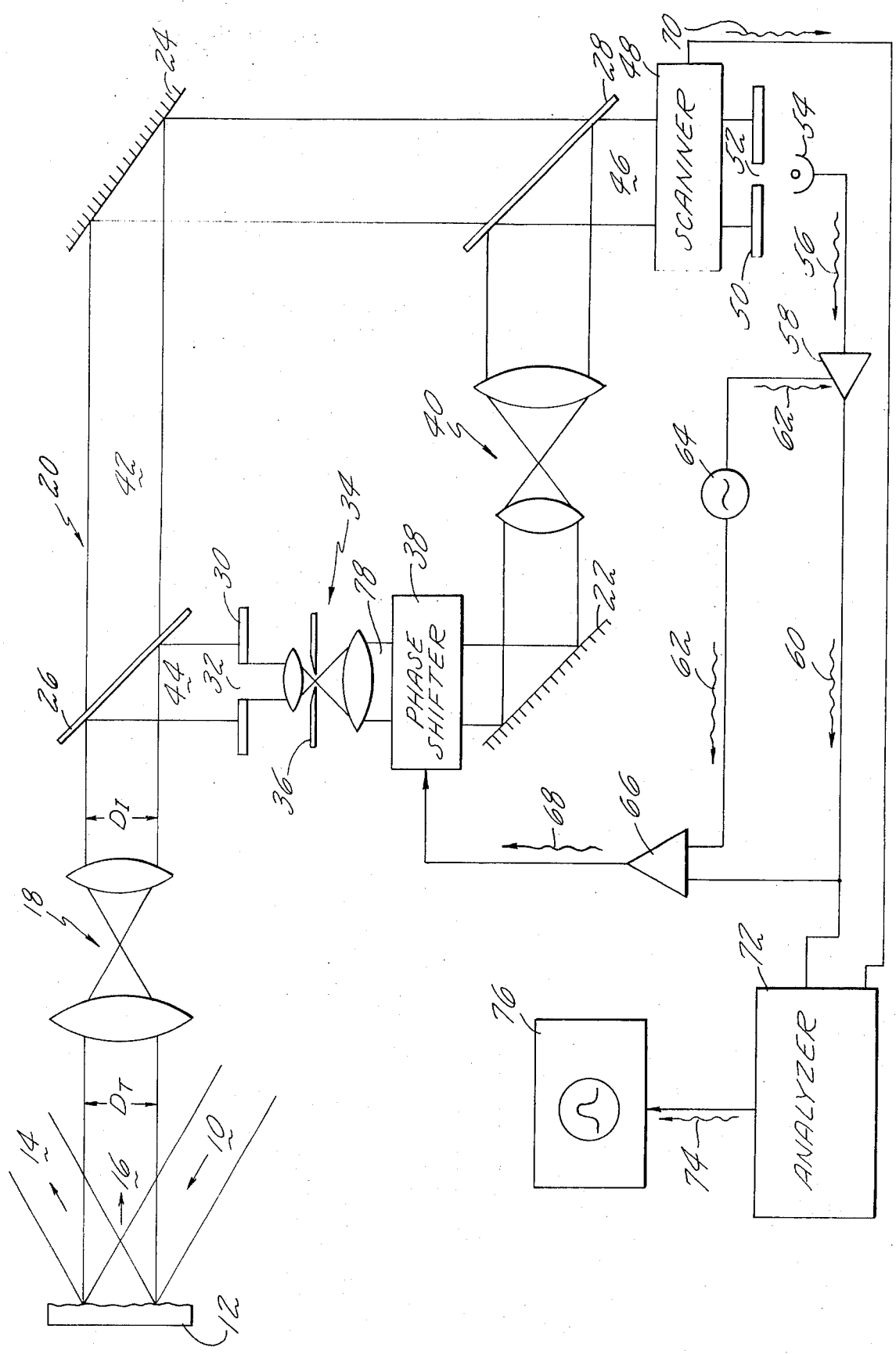

MEASUREMENT OF PHASE PROFILE ACROSS A HIGH POWER LASER BEAM

BACKGROUND OF THE INVENTION

1. Field of Invention

The present invention relates to optical diagnostic equipment and more particularly to a system for determining the phase profile across a beam of optical radiation.

2. Description of the Prior Art

The precise phase distribution present in a beam of optical radiation is often investigated for various reasons related to improving the production or utilization of the radiation. In determining the phase distribution across a beam, usually a sample from the beam and sometimes the beam itself is directed through suitable apparatus to form an interferogram. The interferogram is then analyzed by such techniques as photograph comparison which ordinarily involve laborious and cumbersome mechanical procedures. The photographic interferometric method of phase analysis is not universally applicable. For example, no practical method is known whereby an interferogram of infrared radiation can be recorded. The phase analysis of radiation is complicated further if the power of the radiation is high as is frequently the case in many laser systems. Thus, a current urgent need exists for a simple, adaptable, phase diagnostic system which is applicable to optical radiaton in general, laser radiation in particular, and more particularly to beams of high power laser radiation at infrared wavelengths.

SUMMARY OF THE INVENTION

A primary object of the present invention is the measurement of the spatial distribution of the phase front in a high power beam of laser radiation having spatial and temporal amplitude fluctuations.

According to the present invention an input beam of optical radiation to be analyzed is passed through an interferometer having a phase shifter and a spatial filter in one of its legs; the resulting interference pattern is scanned across an optical detector and a phase sensitive amplifier in combination with a phase dither device provide a correction bias to the phase shifter in order to maintain the interference pattern reaching the detector at peak intensity; movement of the interference pattern across the detector is correlated with the phase shifter drive signal providing a respresentation of the phase spatial distribution in the input beam.

An advantage of the present invention is the ability to measure the spatial distribution of the phase front of a high power laser beam. Also, the variations or range in intensity of the laser beam are readily accommodated since the detector is exposed only to a relative intensity rather than an absolute intensity. The system is capable of providing a display of phase as a function of position across a beam as well as providing a direct electrical signal descriptive of the phase position relationship.

One feature of the present invention is the self-nulling aspect of the phase shifter in the interferometer leg. Also, this device functions well even in the presence of spatial and temporal amplitude fluctuations in the test beam. Another feature of the invention is the high power beam being analyzed is not passed through the measurement equipment but only a relatively low power sample from it is used in the phase measurement process. Further, for any given sample beam a maximum intensity interference signal is produced at the detector. The rate of change of the temporal and spatial amplitude phase fluctuations is determinative of the dither frequency and optical scan frequency.

The foregoing and other objects, features and advantages of the present invention will become more apparent in the light of the following detailed description of a preferred embodiment thereof as illustrated in the accompanying drawing.

BRIEF DESCRIPTION OF THE DRAWING

The FIGURE is a simplified schematic diagram of a phase front measuring device in accordance with the present invention.

BRIEF DESCRIPTION OF A PREFERRED EMBODIMENT

The present invention permits the measurement of the phase profile across a high power beam of laser radiation with apparatus such as is shown in the FIGURE. An incident beam 10 of high power laser radiation is directed against a diffraction grating 12 to provide an output beam 14 and a test beam 16. A test beam telescope 18 reduces the diameter $D_T$ of the test beam to a smaller diameter $D_I$ and ultimately images a chosen location of the test beam on a detector. The test beam is directed into a Mach Zehnder interferometer 20 comprised of a first 22 and a second 24 fully reflecting mirror and a first 26 and a second 28 beam splitter. Disposed in one leg of the interferometer is a blocking plate 30 having a small aperture 32, a phase shifter telescope 34 containing a spatial filter 36, a phase shifter 38 and an interferometer beam matching telescope 40. The beam splitter 26 divides the test beam into a clockwise 42 and a counterclockwise 44 beam element and the elements reform as an interference beam 46 at the beam splitter 28. The beam 46 passes through a two dimensional optical scanner 48 and onto a detector blocking plate 50 having a detection pinhole aperture 52. An optical detector 54 intercepts radiation from the beam 46 and provides a corresponding electrical carrier signal 56 which feeds to a phase sensitive amplifier 58. A phase dither oscillator signal 62 produced by a dither frequency oscillator 64 and a phase sensitive amplifier output signal 60 feed to a high voltage drive amplifier 66 which provides a phase shifter drive signal 68. In addition a scanner position indicator signal 70 and the phase sensitive amplifier output signal feed into a signal analyzer 72 which provides a plotter signal 74 to a phase front plotter 76.

In the operation of the system described above, the incident beam 10 is directed against the grating which is essentially a reflective metal having the capacity to handle a high energy laser beam, the surface of the grating consisting of an array of equally spaced grooves fabricated on the mirror. The major portion of the incoming beam is reflected from the mirror as the output beam; the radiation diffracted into the test beam telescope constitutes the relatively low power test beam which typically contains between $10^{-2}$ and $10^{-5}$ of the power in the output beam. The telescope 18 focuses and modifies the test beam to a beam of diameter $D_I$ which is matched to the beam handling capability of the interferometer. The test beam leaving the telescope 18 retains all the spatial amplitude and phase information contained in the incident beam 10 although the beam power is reduced.

The test beam of diameter $D_I$ is formed into the clockwise and counterclockwise beam elements by the beam splitter 26. The counterclockwise element impinges on the blocking plate and the fraction thereof that passes through the aperture 32 is used to generate a uniphasal reference beam 78. The diameter of the aperture 32 is selected so that the reference beam is uniform in phase profile to within about twenty percent. The spatial filter 36 further cleans the amplitude and phase of the beam 78 by stripping off the side lobes in the distribution of the reference beam as it passes through the filter. The overall result is a reference beam having true uniformity of amplitude and phase prior to its entry into the phase shifter. The reference beam is expanded in diameter to $D_{PS}$ which is the beam diameter limitation of the phase shifter. The amount of phase shift introduced into the reference beam varies; this point is developed in more detail later in the operational sequence. A description of a typical infrared phase shifter and its operation is provided in Gallium Arsinide Electro-Optic Modulators, D. E. Walsh, RCA Review, September 1966, Vol. 27, pp. 323–335.

The phase shifted beam passes through the beam matching telescope 40 wherein the diameter $D_{PS}$ is increased beyond the diameter $D_I$ of the clockwise beam element of the specimen beam to allow for beam steering at the mirror 24; the clockwise beam element and the phase shifted reference beam are recombined at the beam splitter 28; by suitable adjustment of the mirror 24 the two beams are aligned with respect to each other to form an interference pattern.

The two dimensional optical scanner 48 continuously sweeps the interference beam 46 across the detector blocking plate thereby allowing discrete sections of the interference beam to pass through the pinhole aperture and fall on the optical detector in a continuous manner. In the detector the intensity of the interference pattern is converted into the electrical carrier 56 signal which feeds to the phase sensitive amplifier. In the amplifier the phase dither signal 62 provided by the reference frequency oscillator 64 is compared with the carrier signal 56 to provide the phase sensitive amplifier output signal 60 which is a direct reading of the phase of the element of optical radiation that reached the detector; the phase measured is relative to a reference phase at the start of the scan by the scanner. The signal 60 feeds to both the signal analyzer 72 and the high voltage drive amplifier 66. At the signal analyzer the output signal 60 is correlated with the scanner position indicator signal 70 and the phase information received at the analyzer is associated with a precise point in the interference beam 46. The analyzer in turn provides the plotter signal 74 to the plotter 76 which provides a graphic representation of phase as a function of position across the front of the incident beam 10.

The phase shifter 38 is driven by the oscillator signal 62 which causes a dithering phase shift in the reference beam. The dithered phase shift in the reference beam causes a corresponding dither in the intensity of the interference beam being scanned across the detector. The intensity modulation of the carrier signal 56 is compared with the oscillator signal 62 in the phase sensitive detector and the phase sensitive output signal 60 is actually a time varying error signal which drives the phase shifter via amplifier 66 to maintain the amplitude of the interference pattern at maximum intensity. Thus, by a self-nulling technique, the phase difference at a resolution element in the interfering beam is brought to zero; the amount of phase shift required to generate this condition which is represented by the error signal 60 is a direct measure of the relative phase of the beam at this location. By keeping track of this signal as the beam front is scanned a map of phase front is generated.

The frequency at which the oscillator is dithered must be sufficiently high to permit several cycles of intensity modulation of the interference pattern to occur during the residence time of a single resolution element on the optical detector. The scanning rate is determined primarily by the anticipated rate of change in the phase of the interference beam. When the scanning rate and the number of resolution elements have been established, the dither frequency is set over a limited range. For example, a typical scanning frequency of 100 cycles per second and approximately 2,500 resolution elements in a 50 by 55 array corresponds to a dither frequency of substantially 1 megahertz.

Although this invention has been shown and described with respect to a preferred embodiment thereof, it should be understood by those skilled in the art that various changes and omissions in the form and detail thereof may be made therein without departing from the spirit and scope of the invention.

Having thus described a typical embodiment of my invention, that which I claim as new and desire to secure by Letters Patent of the United States is:

1. Apparatus for determining the phase profile across a primary beam of optical radiation comprising:

means for extracting sample radiation from the primary beam to provide a test beam which has all the phase and intensity characteristics of the primary beam and is propagated along a distinct test beam optical path;

an interferometer positioned in the test beam optical path to provide an interference beam which is formed by dividing the test beam into a first and a second beam element with each element propagating through the interferometer along separate paths before recombining with each other to form the interference beam upon leaving the interferometer which includes:

means for providing a reference beam of substantially uniform phase and intensity from the first beam element, and means for causing a shift in the phase of the reference beam;

means for performing a two dimensional scan of the interference beam across an optical detector to allow a continuous sequence of discrete sections of the interference beam to fall on the detector thereby providing a corresponding electrical carrier signal;

a dither frequency oscillator for providing:

a phase shifter drive signal for modifying the intensity of the pattern of the interference beam at the detector, and a reference signal;

a phase sensitive amplifier for comparing the reference signal from the oscillator with the electrical carrier signal from the optical detector to provide a time varying null signal on the phase shifter drive signal, the drive signal causing a nulling shift in phase in the reference beam to maintain the interference beam at maximum intensity; and a signal analyzer for monitoring the time varying nulling signal to correlate the phase of the optical radiation with the scanning means and provide an electrical output signal describing phase as a function of position in the test beam.

2. The invention according to claim 1 including further a phase front plotter which receives the electrical output signal describing the test beam and displays a raster presentation thereof.

3. The invention according to claim 2 wherein the interferometer is a Mach Zehnder interferometer and the means for providing the reference beam include a blocking plate having a circular aperture the diameter of which is sufficiently small that the optical radiation passing therethrough is approximately eighty percent uniphasal.

4. The invention according to claim 3 including further an aperture telescope which matches the diameter of the reference beam to the beam handling capacity of the phase shifter.

5. The invention according to claim 4 including further a spatial filter positioned about the focus point of the aperture telescope to enhance the quality of the reference beam to a beam of substantially uniform phase and intensity.

6. The invention according to claim 5 including further an interferometer beam matching telescope for changing the diameter of the reference beam after phase shifting.

7. The invention according to claim 6 including further a test beam telescope for changing the diameter of the test beam to a diameter compatible with the beam handling capability of the interferometer.

8. The invention according to claim 1 wherein the means for extracting the sample radiation from the primary beam is a diffraction grating.

9. The method of determining the phase profile across a primary beam of optical radiation comprising:

extracting sample radiation from a primary beam to provide a test beam having all the phase characteristics of the primary beam;

propagating the test beam along a test beam optical path which is distinct from the primary beam path of propagation;

dividing the test beam in a first and a second beam element in an interferometer;

forming a beam having a substantially uniform phase profile from the first beam element;

providing a phase shift to the uniform phase beam;

forming an interference beam by optically heterodyning the phase shifted beam and the second beam element;

scanning the interference beam across an optical detector wherein the intensity of the beam is converted into an electrical carrier signal;

comparing the carrier signal with a dither frequency electrical reference signal in a phase sensitive amplifier to provide a phase shifter feedback signal;

adjusting the amount of phase shift applied to the uniform phase beam with the phase shifter feedback signal to maintain maximum brightness in the interference beam;

correlating the phase shifter feedback signal with the resulting interference beam that is intercepted by the optical detector to provide a real time electrical signal describing phase as a function of position in the test beam.

* * * * *